United States Patent
Seo et al.

(10) Patent No.: US 10,652,149 B2
(45) Date of Patent: May 12, 2020

(54) METHOD AND DEVICE FOR TRANSMITTING/RECEIVING DATA USING CACHE MEMORY IN WIRELESS COMMUNICATION SYSTEM SUPPORTING RELAY NODE

(71) Applicants: LG ELECTRONICS INC., Seoul (KR); RESEARCH & BUSINESS FOUNDATION SUNGKYUNKWAN UNIVERSITY, Suwon-si, Gyeonggi-do (KR); KOREA ADVANCED INSTITUTE OF SCIENCE AND TECHNOLOGY, Daejeon (KR)

(72) Inventors: Hanbyul Seo, Seoul (KR); Hojin Song, Seoul (KR); Dongin Kim, Seongnam-si (KR); Wan Choi, Seoul (KR); Byounghoon Kim, Seoul (KR)

(73) Assignees: LG ELECTRONICS INC., Seoul (KR); RESEARCH & BUSINESS FOUNDATION SUNGKYUNKWAN UNIVERSITY, Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 333 days.

(21) Appl. No.: 15/508,308

(22) PCT Filed: Nov. 10, 2015

(86) PCT No.: PCT/KR2015/012071
§ 371 (c)(1),
(2) Date: Mar. 2, 2017

(87) PCT Pub. No.: WO2016/076612
PCT Pub. Date: May 19, 2016

(65) Prior Publication Data
US 2017/0289037 A1 Oct. 5, 2017

Related U.S. Application Data

(60) Provisional application No. 62/077,862, filed on Nov. 10, 2014.

(51) Int. Cl.
*H04L 29/08* (2006.01)
*H04L 12/747* (2013.01)
(Continued)

(52) U.S. Cl.
CPC .......... *H04L 45/742* (2013.01); *H04B 7/155* (2013.01); *H04J 11/00* (2013.01); *H04J 11/005* (2013.01);
(Continued)

(58) Field of Classification Search
CPC .............. H04W 52/243; H04W 52/244; H04B 1/7107; H04B 1/71072; H04L 67/28; H04L 67/2842
See application file for complete search history.

(56) References Cited

U.S. PATENT DOCUMENTS

| 8,934,333 B2 * | 1/2015 | Kim ..................... H04L 1/1819 370/216 |
| 2007/0049199 A1 * | 3/2007 | Lim .................... H04L 25/0206 455/63.1 |

(Continued)

FOREIGN PATENT DOCUMENTS

| CN | 101534181 A | 9/2009 |
| CN | 101692740 A | 4/2010 |

(Continued)

*Primary Examiner* — Jeong S Park
(74) *Attorney, Agent, or Firm* — Birch, Stewart, Kolasch & Birch, LLP

(57) ABSTRACT

The present invention relates to a wireless communication system. More particularly, the present invention relates to a
(Continued)

method for transmitting a content using a cache memory, and a method for transmitting, by a relay node, a content using a cache memory according to the present invention may comprise the steps of: storing a first content, received from a serving cell, in the cache memory; storing a second content, received from an adjacent cell or the serving cell, in the cache memory; selecting a content to be transmitted to a user equipment (UE) from among the first content requested by the UE and the second content which acts as interference to the first content; and transmitting the second content to the UE.

10 Claims, 12 Drawing Sheets

(51) Int. Cl.
| | |
|---|---|
| H04L 1/18 | (2006.01) |
| H04J 11/00 | (2006.01) |
| H04L 1/02 | (2006.01) |
| H04B 7/155 | (2006.01) |
| H04L 29/06 | (2006.01) |
| H04L 1/00 | (2006.01) |

(52) U.S. Cl.
CPC .............. *H04L 1/02* (2013.01); *H04L 1/1819* (2013.01); *H04L 1/1887* (2013.01); *H04L 67/2842* (2013.01); *H04L 67/2847* (2013.01); *H04L 69/22* (2013.01); *H04L 67/2852* (2013.01); *H04L 2001/0097* (2013.01)

(56) References Cited

U.S. PATENT DOCUMENTS

| | | |
|---|---|---|
| 2008/0049718 A1* | 2/2008 | Chindapol ......... H04B 7/15592 370/351 |
| 2009/0185521 A1* | 7/2009 | Li ........................ H04B 1/7107 370/315 |
| 2009/0254790 A1 | 10/2009 | Pi et al. |
| 2011/0124289 A1 | 5/2011 | Balachandran et al. |
| 2012/0230245 A1 | 9/2012 | Östergaard et al. |
| 2013/0242779 A1* | 9/2013 | Mir Ghaderi ......... H04W 24/02 370/252 |
| 2014/0140451 A1 | 5/2014 | Callard et al. |
| 2014/0199945 A1 | 7/2014 | Nagaraj et al. |
| 2014/0370907 A1* | 12/2014 | Song ................... H04W 72/082 455/452.1 |
| 2016/0029321 A1* | 1/2016 | Hwang .................. H04J 11/005 455/450 |
| 2016/0249302 A1* | 8/2016 | Uchiyama ............ H04J 11/0056 |
| 2017/0318593 A1* | 11/2017 | Eriksson ............... H04W 72/08 |

FOREIGN PATENT DOCUMENTS

| | | |
|---|---|---|
| CN | 101993491 A | 3/2011 |
| CN | 103581073 A | 2/2014 |
| CN | 104009776 A | 8/2014 |

* cited by examiner

FIG. 6
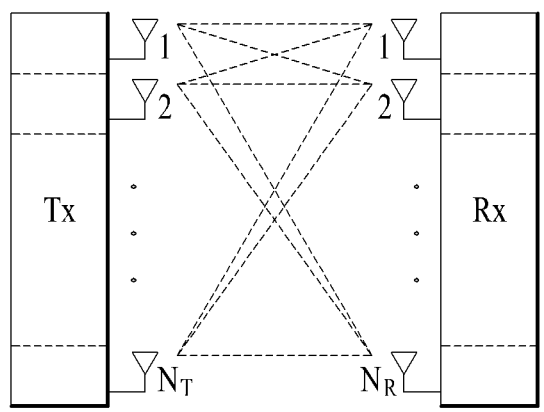
(a)
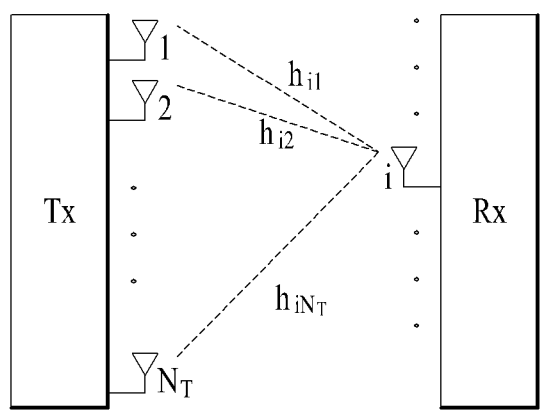
(b)

FIG. 7
(a)
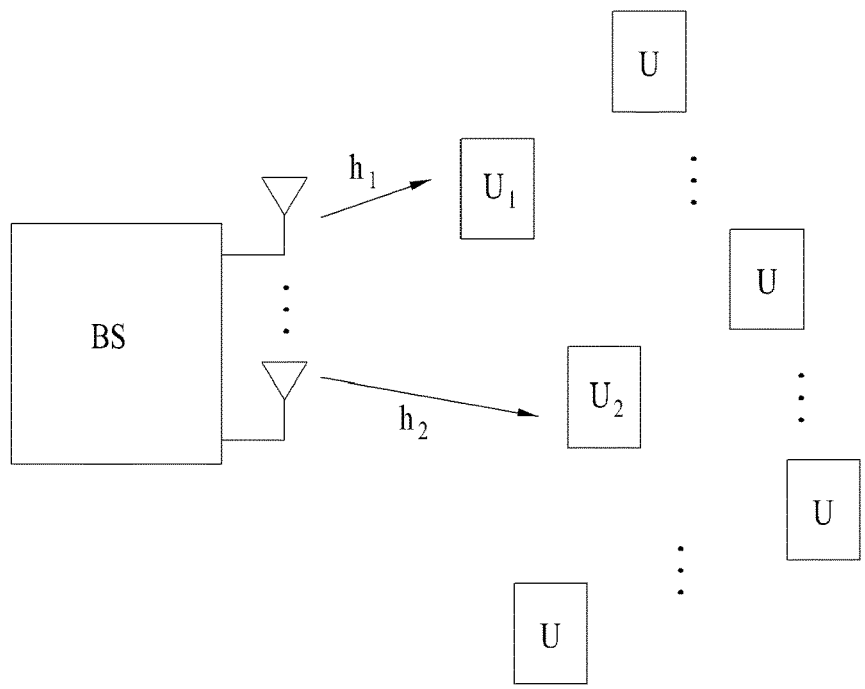
(b)
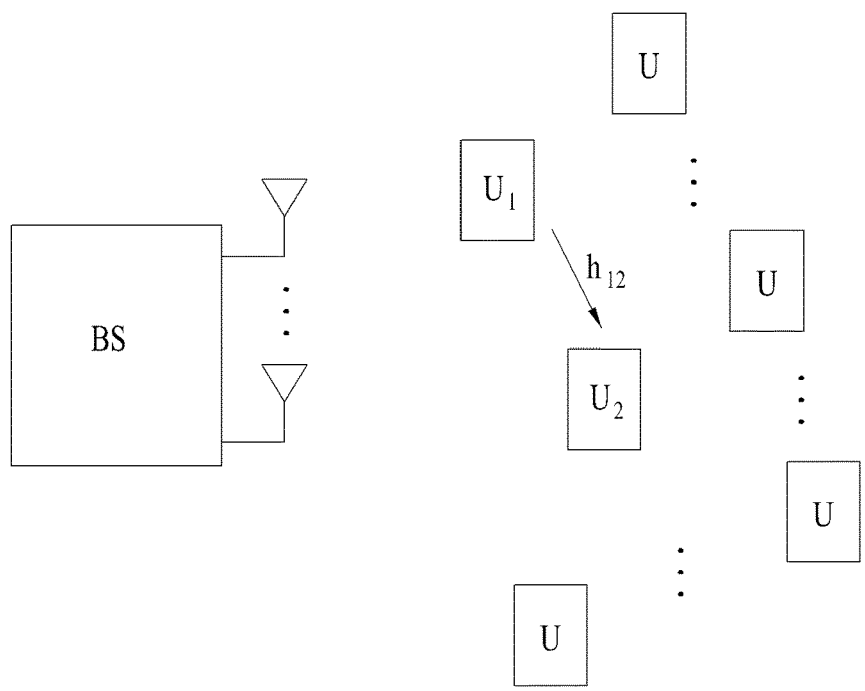

METHOD AND DEVICE FOR TRANSMITTING/RECEIVING DATA USING CACHE MEMORY IN WIRELESS COMMUNICATION SYSTEM SUPPORTING RELAY NODE

CROSS REFERENCE TO RELATED APPLICATIONS

This application is the National Phase of PCT International Application No. PCT/KR2015/012071, filed on Nov. 10, 2015, which claims priority under 35 U.S.C. 119(e) to U.S. Provisional Application No. 62/077,862, filed on Nov. 10, 2014, all of which are hereby expressly incorporated by reference into the present application.

TECHNICAL FIELD

Following description relates to a wireless communication system, and more particularly, to a method of transmitting and receiving data using a cache memory in a wireless communication system supporting a relay node and an apparatus therefor.

BACKGROUND ART

FIG. 1 is a diagram for a relay node (RN) 120 and user equipments (UEs) 141/142 existing in a region of an eNB 110 in a wireless communication system 100. The RN 120 delivers data received from the eNB 110 to the UE 142 belonging to a region of the RN and delivers data received from the UE 142 belonging to the region of the RN to the eNB 110. And, the RN 120 expands a fast data rate area, enhances communication quality of a cell edge, and supports in providing communication to the inside of a building or an area deviated from an area serviced by the eNB. In FIG. 1, assume that there exists such a UE directly receiving a service from an eNB (hereinafter, macro-UE or M-UE) as the UE 141 and a UE receiving a service through the RN 120 (hereinafter, relay-UE or R-UE) such as the UE 142.

A radio link between the eNB 110 and the RN 120 is referred to as a backhaul link. A link from the eNB 110 to the RN 120 is referred to as a backhaul downlink and a link from the RN 120 to the eNB 110 is referred to as a backhaul uplink. A radio link between the RN 120 and the UE 142 is referred to as an access link. A link from the RN 120 to the UE 142 is referred to as an access downlink and a link from the UE 142 to the RN 120 is referred to as an access uplink.

If the RN 120 autonomously controls a cell, the UE 142 can recognize the RN 120 as a general eNB. Meanwhile, if a different UE functions as the RN 120 (this RN is referred to as a UE-relay), the UE 142 is unable to recognize the existence of the RN 120.

DISCLOSURE OF THE INVENTION

Technical Tasks

A technical task of the present invention is to provide a method of easily delivering preferred content when the content is transmitted to a UE from an eNB through a relay node. Specifically, a technical task of the present invention is to provide a method of configuring content to be delivered through a relay node when the relay node transmits the content to a UE. Another technical task of the present invention is to provide a method of efficiently cancelling interference received from an adjacent cell through a relay node.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a content, which is transmitted by a relay node using a caching memory, includes the steps of storing at least a first content received from a serving cell in a caching memory, storing a second content received from a neighbor cell or the serving cell in the caching memory, selecting a content to be transmitted to a user equipment from among the first content requested by the user equipment and the second content acting as interference to the first content, and transmitting the second content to the user equipment.

To further achieve these and other advantages and in accordance with the purpose of the present invention, according to a different embodiment, a method of receiving a content, which is received by a user equipment using caching, includes the steps of receiving a first content requested by the user equipment from a base station, receiving a second content acting as interference to the first content from a relay node, and restoring the first content based on the first content and the second content.

To further achieve these and other advantages and in accordance with the purpose of the present invention, according to a further different embodiment, a relay node transmitting a content using a cache memory includes a caching memory configured to store at least a first content received from a serving cell and a second content received from a neighbor cell or a serving cell, a processor configured to select a content to be transmitted to a user equipment from among the first content requested by a user equipment and the second content acting as interference to the first content, and a transceiver configured to transmit the second content to the user equipment.

To further achieve these and other advantages and in accordance with the purpose of the present invention, according to a further different embodiment, a user equipment receiving a content using caching includes a transceiver configured to receive a first content requested by the user equipment from a base station and receive a second content acting as interference to the first content from a relay node, memory, and a processor configured to restore the first content based on the first content and the second content.

Following items can be commonly applied to the embodiments of the present invention.

The content to be transmitted to the user equipment can be determined based on reception SNR (signal to noise ratio) of the user equipment.

In this case, the second content can be transmitted based on an interference neutralization scheme. Or, the second content can be transmitted based on a scheme of using SIC (successive interference cancellation) through interference decoding.

If the first content or the second content is stored in the caching memory, a relay node can transmit HARQ (hybrid automatic repeat and request) confirmation response information to a base station.

The HARQ (hybrid automatic repeat and request) confirmation response information may correspond to a positive reception response (ACK).

Meanwhile, the user equipment can cancel interference received from an adjacent base station based on the second content. In this case, the interference received from the adjacent base station can be canceled using energy combining.

It is to be understood that both the foregoing general description and the following detailed description are exemplary and explanatory and are intended to provide further explanation of the invention as claimed.

Advantageous Effects

According to the present invention, it is able to provide a method of more successfully delivering content when the content is transmitted to a UE from an eNB through a relay node. And, it is able to provide a method of configuring content to be delivered through a relay node when the relay node transmits the content to a UE. And, according to the present invention, it is able to efficiently cancel interference received from an adjacent cell from a UE based on content transmitted through a relay node.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 6 is a diagram for a configuration of a wireless communication system equipped with multiple antennas;

FIG. 7 is a diagram for conceptually explaining multi-user environment;

BEST MODE

Mode for Invention

Figure 1:
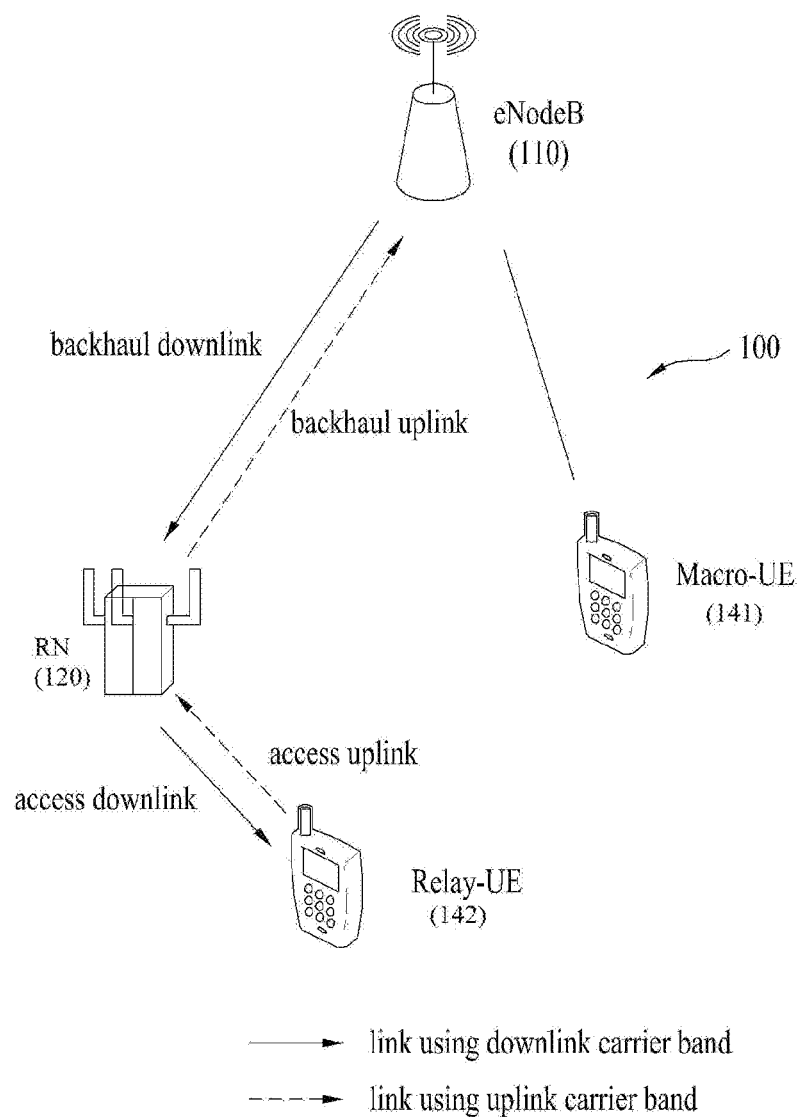
FIG. 1 is a diagram for a wireless communication system including a base station, a user equipment, and a relay node.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point (AP)," "remote radio head (RRD)," "transmission point (TP)," and "reception point (RP)." The term "relay" may be replaced with terms such as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

Figure 2:
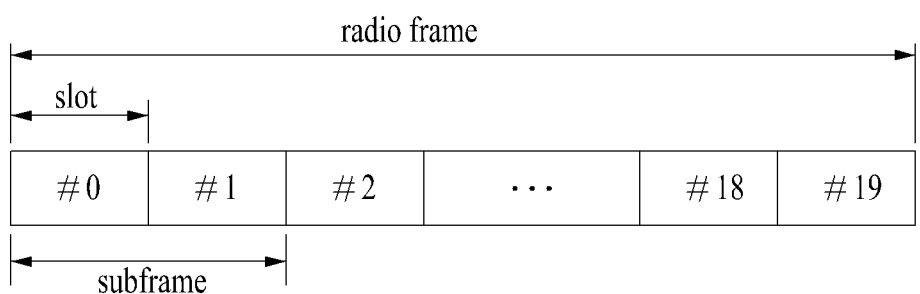
FIG. 2 is a diagram for a structure of a radio frame used in 3GPP LTE system.

FIG. 2 is a diagram for a structure of a radio frame used in 3GPP LTE system.

Referring to FIG. 2, in a cellular OFDM radio packet communication system, uplink/downlink data packet transmission is performed in a unit of subframe, wherein one subframe is defined by a given time interval that includes a plurality of OFDM symbols.

One radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain. Meanwhile, the TTI may correspond to a time interval for transmitting a coded packet in a physical layer. Hence, one subframe or a plurality of adjacent subframes can be used when a data packet is transmitted. Since the 3GPP LTE system uses OFDM in a downlink, OFDM symbols represent one symbol period. One symbol may be referred to as SC-FDMA symbol or symbol period in uplink. The resource block (RB) as a resource allocation unit may include a plurality of continuous subcarriers in one slot. The aforementioned structure of the radio frame is just an example only. Hence, the number of subframes included in a radio frame, the number of slots included in one subframe, the number of OFDM symbols included in one slot may change in various ways.

Figure 3:
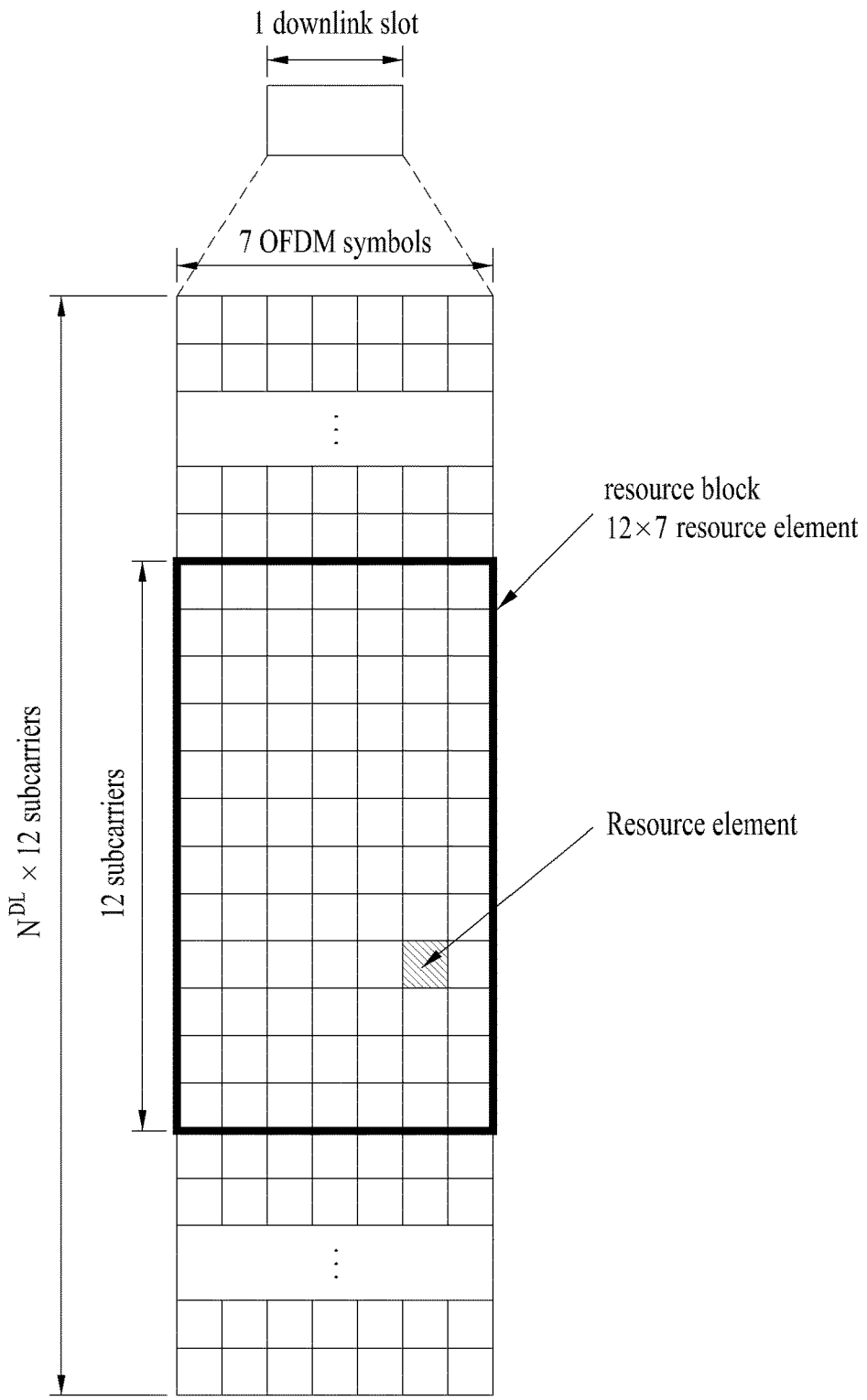
FIG. 3 is a diagram for a resource grid in a downlink slot.

FIG. 3 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 4:
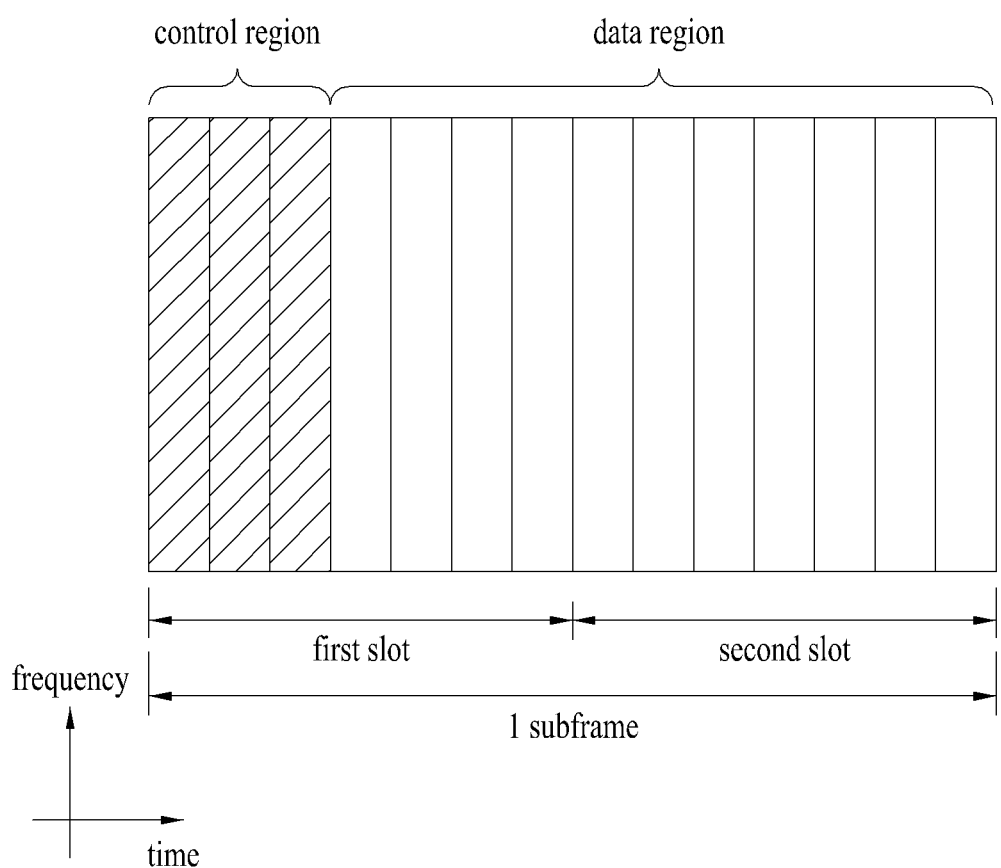
FIG. 4 is a diagram for a structure of a downlink subframe.

FIG. 4 is a diagram for a structure of a downlink subframe. Referring to FIG. 4, maximum three OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK signals in response to uplink transmission. The control information transmitted through the PDCCH will be referred to as downlink control information (DCI). The DCI includes uplink/downlink scheduling information or uplink transmission (Tx) power control command for a random UE group. The PDCCH may include transport format and resource allocation information of a downlink shared channel (DL-SCH), resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined according to correlation between the number of CCEs and a coding rate provided by the CCE. The number of CCEs used for transmitting the PDCCH is referred to as a CCE aggregation level. And, the CCE aggregation level corresponds to a CCE unit for searching for the PDCCH. A size of the CCE aggregation level is defined by the number of adjacent CCEs. For example, the CCE aggregation level may correspond to 1, 2, or 8.

An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 5:
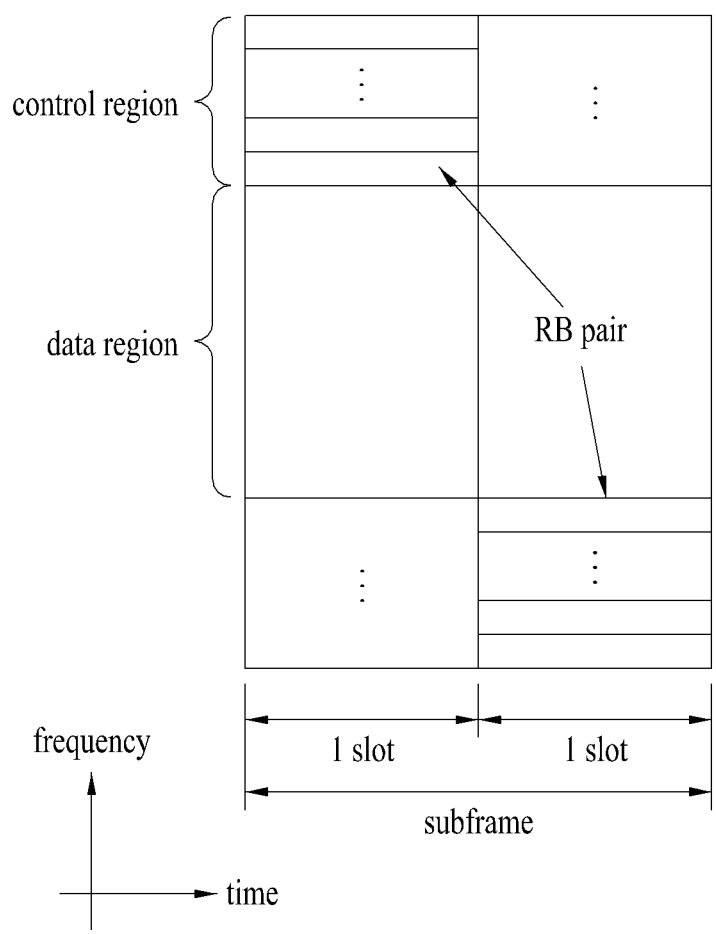
FIG. 5 is a diagram for a structure of an uplink subframe.

FIG. 5 is a diagram for a structure of an uplink subframe. An uplink subframe can be divided into a control region and a data region in frequency domain. PUCCH (physical uplink control channel) including uplink control information is assigned to the control region. PUSCH (physical uplink shared channel) including user data is assigned to the data region. In order to maintain single carrier property, a UE does not transmit the PUCCH and the PUSCH at the same time. PUCCH for a UE is assigned to a resource block (RB) pair in a subframe. Resource blocks belonging to a resource block pair occupy a different subcarrier for two slots. This is referred to as a resource block pair allocated to PUCCH frequency hopped at a slot boundary.

Modeling of MIMO System

FIG. 6 illustrates configuration of a wireless communication system having multiple antennas.

Referring to FIG. 6(a), if the number of transmit (Tx) antennas increases to $N_T$, and the number of receive (Rx) antennas increases to $N_R$, a theoretical channel transmission capacity of the wireless communication system increases in proportion to the number of antennas, differently from a case in which only a transmitter or receiver uses multiple antennas, and accordingly transmission rate and frequency efficiency may be significantly increased. In this case, the transfer rate acquired by the increasing channel transmission capacity may theoretically increased by a predetermined amount that corresponds to multiplication of a maximum transfer rate ($R_o$) acquired when one antenna is used by a rate of increase ($R_i$). The rate of increase ($R_i$) may be represented by the following Equation 1.

$$R_i = \min(N_T, N_R) \quad \text{[Equation 1]}$$

For example, provided that a MIMO system uses four Tx antennas and four Rx antennas, the MIMO system may theoretically acquire a high transfer rate which is four times that of a single antenna system. After the above-mentioned theoretical capacity increase of the MIMO system was demonstrated in the mid-1990s, many developers began to conduct intensive research into a variety of technologies which may substantially increase data transfer rate using the theoretical capacity increase. Some of the above technologies have been reflected in a variety of wireless communication standards such as, for example, third-generation mobile communication and next-generation wireless LAN.

A variety of MIMO-associated technologies have been intensively researched. For example, research into information theory associated with MIMO communication capacity under various channel environments or multiple access environments, research into a radio frequency (RF) channel measurement and modeling of the MIMO system, and research into space-time signal processing technology have been conducted.

Mathematical modeling of a communication method for use in the aforementioned MIMO system will hereinafter be described in detail. It is assumed that the system includes $N_T$ Tx antennas and $N_R$ Rx antennas.

In the case of a transmission signal, the maximum number of pieces of transmittable information is $N_T$ under the condition that $N_T$ Tx antennas are used, and the transmission information may be represented by the following equation.

$$S = [s_1, s_2, \ldots, s_{N_T}]^T \quad \text{[Equation 2]}$$

Individual transmission pieces of information $s_1, s_2, \ldots, s_{N_T}$ may have different transmit powers. In this case, if the individual transmit powers are denoted by $P_1, P_2, \ldots, P_{N_T}$, transmission information having an adjusted transmit power may be represented by the following equation.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

$\hat{s}$ may be represented by the following equation using a diagonal matrix P of transmit powers.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector $\hat{S}$ having adjusted transmit powers is applied to a weight matrix W, and thus $N_T$ transmission signals $x_1, x_2, \ldots, x_{N_T}$ to be actually transmitted are configured. In this case, the weight matrix W serves to properly distribute transmission information to individual antennas according to transmission channel situations. The above-mentioned transmission signals $x_1, x_2, \ldots, x_{N_T}$ may be represented by the following equation using vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $W_{ij}$ denotes a weight corresponding to the i-th Tx antenna and the j-th information. W is also called a precoding matrix.

When $N_R$ Rx antennas are used, received signals $y_1, y_2, \ldots, Y_{N_R}$ of individual antennas may be represented by a vector shown in the following equation.

$$y = [y_1, y_2, \ldots, y_{N_R}]^T \quad \text{[Equation 6]}$$

When channel modeling is executed in the MIMO communication system, individual channels may be distinguished from each other according to Tx/Rx antenna indexes. A specific channel from a Tx antenna j to an Rx antenna i is denoted by $h_{ij}$. Regarding $h_{ij}$, it should be noted that an Rx antenna index is located ahead of a Tx antenna index.

FIG. 6(b) shows channels from NT Tx antennas to Rx antenna i. The channels may be represented in the form of a vector or matrix. Referring to FIG. 6(b), the channels from the NT Tx antennas to the Rx antenna i may be represented by the following equation.

$$h_i^T = [h_{i1}, h_{i2}, \ldots, h_{iN_T}] \quad \text{[Equation 7]}$$

All channels from the $N_T$ Tx antennas to $N_R$ Rx antennas may also be represented as the following.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Additive white Gaussian noise (AWGN) is added to an actual channel after application of channel matrix H. AWGN $n_1, n_2, \ldots, n_{NR}$ added to each of $N_R$ Rx antennas may be represented by the following equation.

$$n = [n_1, n_2, \ldots, n_{N_R}]^T \qquad \text{[Equation 9]}$$

Reception signal calculated by the mathematical modeling described above may be represented by the following equation.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & w_{iN_T} \\ \vdots & & \ddots & \\ h_{N_R 1} & h_{N_R 2} & \cdots & w_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_j \\ \vdots \\ n_{N_R} \end{bmatrix} = \qquad \text{[Equation 10]}$$

$$Hx + n$$

The number of rows and the number of columns of channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \lambda N_T$ matrix.

A rank of a matrix is defined by a smaller number between the number of rows and the number of columns, in which the rows and the columns are independent of each other. Therefore, the matrix rank may not be higher than the number of rows or columns. The rank of the channel matrix H may be represented by the following equation.

$$\text{rank}(H) \leq \min(N_T, N_R) \qquad \text{[Equation 11]}$$

The rank may be defined as the number of non-zero Eigen values when Eigen value decomposition is performed on the matrix. Similarly, the rank may be defined as the number of non-zero singular values when singular value decomposition is performed on the matrix. Accordingly, the rank of the channel matrix refers to a maximum number of pieces of information that may be transmitted on a given channel.

Multi-User-MIMO Operation

Multi-user MIMO (multiple user-MIMO, hereinafter MU-MIMO) corresponds to an operation that a base station equipped with multiple antennas provides a service to a plurality of users (terminals) at the same time. If a plurality of the users receive a service from the base station at the same time, a signal for one terminal may act as interference to another terminal, thereby degrading overall system performance. Hence, in order to properly perform data transmission and reception according to the MU-MIMO operation, it is necessary to cancel interference between users. To this end, the base station can perform signal processing according to an interference cancellation scheme on a signal to be transmitted to multiple users.

The base station can encode each of information blocks to be transmitted to a terminal using an independent codeword. The encoded codewords can be transmitted according to the interference cancellation scheme. For example, when the base station transmits a codeword to a plurality of terminals, the base station can transmit the codeword in a manner of cancelling interference from the codeword in advance. If a signal transmitted to one UE ($U_1$) is eliminated from a signal transmitted to another UE ($U_2$) in advance (pre-subtraction), the UE ($U_2$) can receive a signal from the base station as if interference did not exist. Hence, it is not necessary for the UE ($U_2$) to perform a separate interference cancellation operation. As the interference cancellation scheme, it may apply ZF-DPC (zero forcing-dirty paper coding), ZF (zero forcing), and the like.

First of all, the ZF-DPC is explained. Assume that two UEs ($U_i$ and $U_2$) receive a service from a base station at the same time. Then, it may indicate a compound channel $H = [h_1 \ h_2]$ of a channel (h1) of the $U_1$ and a channel (h2) of the $U_2$. If LQ decomposition is performed on the compound channel H, as shown in equation 12 in the following, the compound channel H can be decomposed into a lower triangular matrix L and an orthogonal matrix Q.

$$H = LQ = \begin{bmatrix} l_{11} & 0 \\ l_{21} & l_{22} \end{bmatrix} \begin{bmatrix} q_{11} & q_{12} \\ q_{21} & q_{22} \end{bmatrix} \qquad \text{[Equation 12]}$$

In equation 12, if MIMO transmission is performed using a column of a matrix Q as a beamforming vector, the lower triangular matrix L is left only from a signal received by a UE. If a base station is aware of channel environment for each UE, encoding can be performed in a manner of transmitting an encoded component by avoiding an interference component of a second row without interference of a first row. In this case, if a beamforming vector $w_i$ for each UE (i.e., beamforming vector for the $U_1$ corresponds to $w_1$ and beamforming vector for the $U_2$ corresponds to $w_2$) corresponds to $q_i (w_i = q_i)$, an effective channel can be represented as equation 14 in the following. Since it is able to transmit a signal to be transmitted to a UE without interference received from a signal to be transmitted to a different UE, the UE is able to properly receive a signal from a base station without a separate operation for cancelling interference.

$$h_i w_k = \begin{cases} l_{ii} & i = k \\ 0 & i \neq k \end{cases} \qquad \text{[Equation 13]}$$

In case of the ZF beamforming, as shown in equation 15 in the following, it may be able to cancel interference by performing pseudo-inverse on a compound channel H.

$$h_i w_k = \begin{cases} \dfrac{l}{\|w_i\|} & i = k \\ 0 & i \neq k \end{cases} \qquad \text{[Equation 14]}$$

In equation 15, $X^H$ corresponds to a hermit matrix for a matrix X and $X^{-1}$ corresponds to an inverse matrix for the matrix X. Each column of a matrix F shown in equation 15 becomes a beamforming vector for each UE. In particular, it can be represented as $w_i = f_i$. In this case, an effective channel for each UE can be represented as equation 15 in the following.

$$h_i w_k = \begin{cases} \dfrac{l}{\|w_i\|} & i = k \\ 0 & i \neq k \end{cases} \qquad \text{[Equation 15]}$$

If the ZF scheme is used, a channel of each UE has a form of a unit (identity) matrix. Hence, as a result, it may be able to receive a signal from which interference is cancelled.

Relay Node

For instance, a relay node can be considered to expand coverage of a fast data rate, enhance group mobility, arrange a temporary network, increase a cell boundary throughput and/or provide network coverage in a new region.

Referring back to FIG. 1, a relay node 120 plays a role of forwarding transmission and reception between a base station 110 and a user equipment 142. Two types of links (a backhaul link and an access link) including attributes different from each other are applied to a carrier frequency band, respectively. The base station 110 may include a donor cell. The relay node 120 accesses a wireless-access network in wireless via the donor cell 110.

In case that a backhaul link between the base station 110 and the relay node 120 uses a DL frequency band or a DL subframe resource, it may be represented as a backhaul downlink. In case that the backhaul link between the base station and the relay node uses an UL frequency band or an UL subframe resource, it may be represented as a backhaul uplink. In this case, the frequency band corresponds to a resource allocated in a FDD (frequency division duplex) mode and the subframe corresponds to a resource allocated in a TDD (time division duplex) mode. Similarly, in case that an access link between the relay node 120 and the user equipment 142 uses a DL frequency band or a DL subframe resource, it may be represented as an access downlink. In case that the access link between the relay node and the user equipment uses an UL frequency band or an UL subframe resource, it may be represented as an access uplink. FIG. 1 shows configurations of backhaul uplink/downlink and access uplink/downlink of an FDD mode relay node.

It is required for the base station to have functions of UL reception and DL transmission. It is required for the user equipment to have functions of UL transmission and DL reception. Meanwhile, it is required for the relay node to have functions of backhaul UL transmission to the base station, access UL reception from the user equipment, backhaul DL reception from the base station and access DL transmission to the user equipment.

Meanwhile, regarding a band (or spectrum) use of the relay node, one case that a backhaul link and an access link operate on a same frequency band may correspond to 'in-band' and another case that the backhaul link and the access link operate on frequency bands different from each other may correspond to 'out-band'. In both of the above-mentioned two cases, it is necessary for a user equipment (hereinafter, a legacy user equipment) operating in a legacy LTE system (e.g., Release-8) to access a donor cell.

Relay nodes can be classified into a transparent relay node and a non-transparent relay node depending on whether or not a user equipment recognizes a relay node. In particular, the 'transparent' may mean a case that the user equipment is unable to recognize whether or not the user equipment is communicating with a network via the relay node. And, the 'non-transparent' may mean a case that the user equipment is able to recognize whether or not the user equipment is communicating with the network via the relay node.

Regarding controls of a relay node, relay nodes can be classified into a relay node configured as a part of a donor cell and a relay node capable of autonomously controlling a cell.

Although the relay node configured as a part of the donor cell may have a relay node identity (ID), the relay node does not have a cell identity of its own. If at least a part of RRM (Radio Resource Management) is controlled by a base station to which the donor cell belongs thereto (despite that the rest of the RRM is located at the relay node), the above-mentioned relay node may be considered as the relay node configured as a part of the donor cell. Preferably, this sort of relay nodes may be able to support a legacy user equipment. For example, smart repeaters, decode-and-forward relay nodes, various types of L2 ($2^{nd}$ layer) relay nodes, and a type-2 relay node correspond to the above-mentioned relay node.

In case of the relay node configured to autonomously control a cell, the relay node controls one or more cells and a unique physical layer cell identity is provided to each of the cells controlled by the relay node. And, each of the cells controlled by the relay node can use an identical RRM mechanism. In the aspect of a user equipment, there is no difference between accessing a cell controlled by the relay node and accessing a cell controlled by a general base station. Preferably, the cell controlled by the above-mentioned relay node may be able to support a legacy user equipment. For example, a self-backhauling relay node, an L3 (3rd layer) relay node, a type-1 relay node, and a type-1a relay node may correspond to the above-mentioned relay node.

The type-1 relay node corresponds to an in-band relay node and controls a plurality of cells. And, a user equipment may consider each of a plurality of the cells as an individual cell discriminated from a donor cell. Moreover, each of a plurality of the cells has a physical cell ID (defined in LTE Release-8) of its own and the relay node may be able to transmit a synchronization channel of the relay node, a reference signal and the like. In case of a single-cell operation, the user equipment may directly receive scheduling information and a HARQ feedback from the relay node and may be able to transmit a control channel (scheduling request (SR), CQI, ACK/NACK, etc.) of the user equipment to the relay node. Moreover, legacy user equipments (e.g., user equipments operating in LTE Release-8 system) may consider the type-1 relay node as a legacy base station (e.g., a base station operating according to the LTE Release-8 system). In particular, the type-1 relay node has backward compatibility. Meanwhile, in the aspect of the user equipments operating according to the LTE-A system, since the type-1 relay node is considered as a base station different from the legacy base station, performance can be enhanced.

Besides the operation of out-band, the type-1a relay node has the same features of the aforementioned type-1 relay node. The operation of the type-1a relay node can be configured to minimize (or eliminate) the influence on L 1 (first layer) operation.

The type-2 relay node corresponds to an in-band relay node and does not have a separate physical cell ID. Hence, the type-2 relay node does not form a new cell. The type-2 relay node is transparent to a legacy user equipment and the legacy user equipment is unable to recognize the presence of the type-2 relay node. Although the type-2 relay node is able to transmit PDSCH, the type-2 relay node may not transmit at least CRS and PDCCH.

Hybrid Automatic Repeat and Request (HARQ) Operation

As a method of controlling a failure of data reception, it may apply a HARQ operation described in the following. When a data transmitting end transmits a packet, if the data transmitting end receives an ACK signal from a data receiving end, the data transmitting end transmits a new packet. If the data transmitting end receives an NACK signal, the data transmitting end may retransmit the previously transmitted packet. In this case, a packet to which encoding according to FEC (forward error correction) function is applied can be retransmitted. Hence, in the aspect of the data receiving end, when a packet is received and decoded, if the data receiving end succeeds in decoding the packet, the data receiving end transmits an ACK signal. If the data receiving end fails to decode the packet, the data receiving end transmit NACK and store the received packet in a buffer. If a retransmitted packet is received in response to the NACK signal, the data receiving end performs decoding in a manner of combining the retransmitted packet and the packet stored in the buffer with each other. By doing so, it is able to enhance a reception success rate of a packet.

HARQ schemes can be classified into synchronous HARQ and asynchronous HARQ according to retransmission timing. In case of the synchronous HARQ, if initial transmission fails, retransmission is performed at the timing determined by a system. For example, if it is determined that retransmission is performed at every $4^{th}$ time unit (e.g., subframe) after the initial transmission failure, it is necessary to additionally inform the data receiving end of information on the retransmission timing. Hence, if the data transmitting end receives an NACK signal, the data transmitting end retransmits a packet at every $4^{th}$ time unit until an ACK signal is received. Meanwhile, in case of the asynchronous HARQ, the information on the retransmission timing is separately scheduled. Hence, retransmission timing of a packet corresponding to the NACK signal may change due to various conditions such as a channel state, and the like.

HARQ schemes can be classified into an adaptive HARQ scheme and a non-adaptive HARQ scheme according to whether or not a channel state is reflected to the amount of resources used for retransmission. In case of the non-adaptive HARQ scheme, an MCS level of a retransmitted packet, the number of resource blocks, and the like determined at the time of initial transmission are maintained as it is. For example, when a transmitting end performs initial transmission, if the transmitting end transmits data using 8 resource blocks, the transmitting end performs retransmission using 8 resource blocks as well. Meanwhile, in case of the adaptive HARQ scheme, a modulation scheme of a packet, the number of resource blocks, and the like are vary depending on a channel state. For example, although a transmitting end performs initial transmission using 8 resource blocks, the transmitting end may perform retransmission using resource blocks greater than or less than 8 resource blocks.

As mentioned in the foregoing description, when a data packet is transmitted through HARQ, a transmitting end can perform initial transmission and retransmission in a sub-packet unit by converting the data packet into a sub-packet of a predetermined size. A receiving end may attempt to decode the data packet by combining a plurality of sub-packets with each other.

According to the HARQ scheme, a plurality of sub-packets used for initial transmission and retransmission are generated from a single codeword packet. In this case, a plurality of the generated sub-packets can be distinguished from each other according to a length of a sub-packet and a start position of a sub-packet. A sub-packet capable of being distinguished is referred to as an RV (redundancy version). A receiving end may attempt to decode the entire codewords by receiving and combining RVs different from each other. For example, decoding can be performed by receiving packets as many as a difference between the total codeword packets to be received and already received sub-packets. This HARQ operation can be referred to as a HARQ operation of an incremental redundancy (IR) type.

Partial Signal Delivered Through Relay Node in Multi-User Environment

FIG. 7 is a diagram for conceptually explaining multi-user environment. In an example of FIG. 7, assume that a base station is equipped with multiple antennas and is able to support MU-MIMO transmission and assume that each of user equipments ($U_1$, $U_2$, . . . ) is equipped with a single antenna. However, the assumptions are just an example only for clarity of explanation. The principle of the present invention described in the following can be identically applied to UE(s) equipped with multiple antennas as well.

Referring to FIG. 7(*a*), a plurality of UEs ($U_1$, $U_2$, . . . ) can receive a signal from a base station (BS) at the same time. A channel to the $U_1$ is referred to as $h_1$ and a channel to the $U_2$ can be referred to as $h_2$. For example, assume that the $U_1$ has a good channel state since the $U_1$ is located at a point adjacent to the base station and the $U_2$ has a relatively poor channel state compared to the $U_1$, since the $U_2$ is located at a cell edge. In order to guarantee data transmission transmitted to a UE of a poor channel state, the base station can transmit a signal with higher power. However, a problem of interference may occur. In order to solve the interference problem, as mentioned in the foregoing description, it may be able to introduce various relay nodes. Yet, in order to install a new relay node in a network, a separate resource is required. Hence, it may consider a method that a UE of a good channel state plays a role of a relay node among a plurality of UEs. The UE playing a role of a relay node can be referred to as a UE-relay. The UE-relay may correspond to the aforementioned type-2 relay node. In particular, the UE-relay is transparent to a UE to which data is forwarded.

FIG. 7(*b*) shows a case that the $U_1$ plays a role of a UE-relay and the $U_2$ receives data from the base station through the $U_1$. If it is able to perform data transmission via cooperation between UEs in multi-user environment, it may be able to enhance overall transmission capability and efficiency of resource use. For example, a UE ($U_1$) of better channel environment with a base station compared to other UEs may play a role of a UE-relay and may be able to help data to be transmitted to a different UE ($U_2$) of poor channel environment. Specifically, the $U_1$ can receive data transmitted to the $U_2$ from the base station while receiving data of the $U_1$ from the base station. The $U_1$ can forward data to be forwarded to the $U_2$ to the $U_2$ among the data received by the $U_1$. In the aspect of the $U_2$, the $U_2$ can obtain data of the $U_2$ via data directly received from the base station and the data forwarded by the $U_1$. This type of data transmission scheme can be referred to as a partial signal forwarding scheme.

Figure 8:
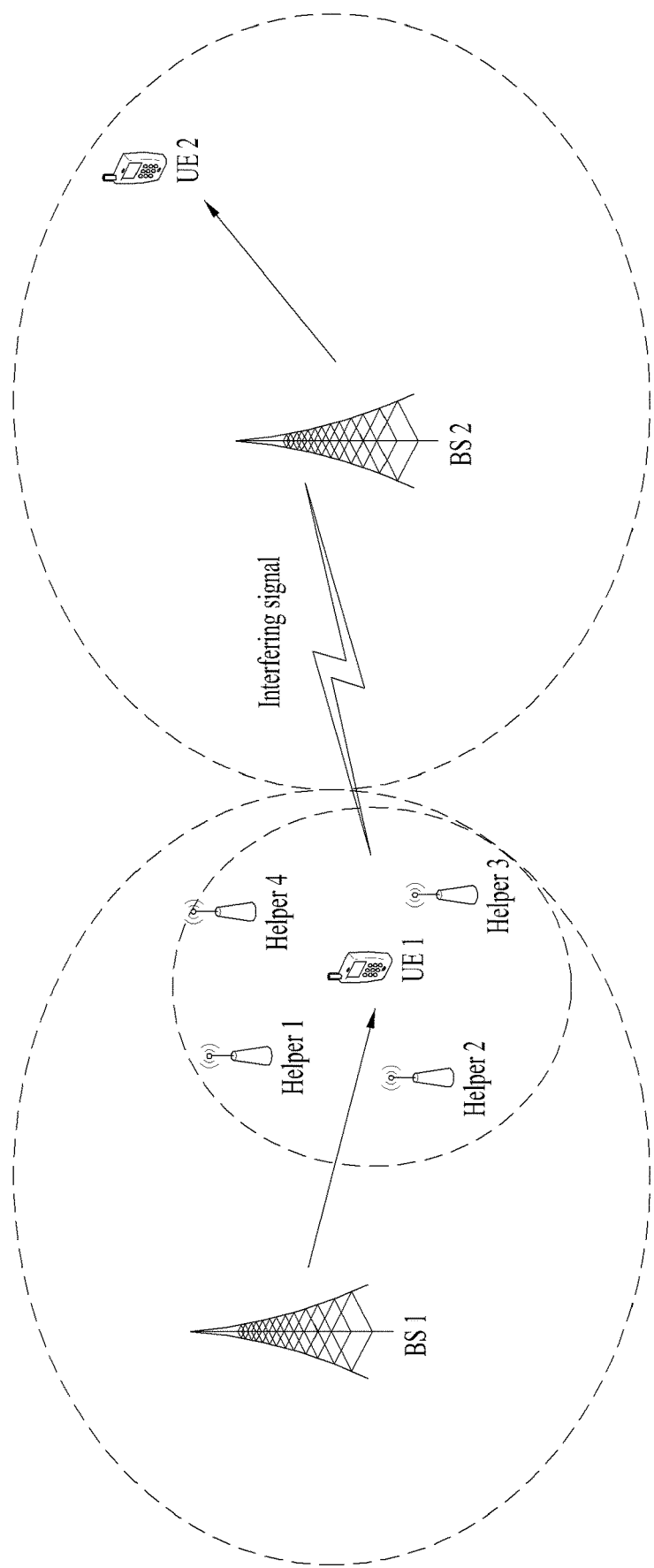
FIG. 8 is a diagram for an example of a communication system capable of being applied to the present invention.

FIG. 8 is a diagram for an example of a communication system capable of being applied to the present invention.

Referring to FIG. 8, in the present invention, it may apply environment that a base station (BS1) directly provides a service to a user or indirectly provides a service to the user through a plurality of relay nodes (helper 1, . . . , helper 4) in downlink. In some cases, the base station may become a base station of a macro cell and the relay nodes may become a small base station of a femto cell or a pico cell. Or, as mentioned earlier in FIG. 7, the relay node may correspond to a UE-relay.

Referring to FIG. 8, when a base station transmits a content required by a UE to the UE in DL, it may consider environment of interference received from a neighbor cell (e.g., BS2) in the present invention. Referring to FIG. 8, communication environment of the present invention corresponds to environment that a plurality of relay nodes in a cell or relay nodes (helpers) exist in the vicinity of a UE and a caching memory of a relay node is utilized for helping content transmission transmitted by a base station. In this case, a part of content required by a UE can be transmitted to the UE in a manner that a relay node or a proxy stores the part of the content in a caching memory in advance. A scheme of using the caching memory is referred to as caching.

In case of transmitting content by utilizing legacy caching, it may utilize a prefix caching technique that a relay node or a proxy stores a front part of content required by a UE or a user in a caching memory in advance. In general, since an average channel between a relay node and a UE is better than an average channel between a base station and the UE, the relay node can transmit a signal to the UE with reception SNR higher than that of the base station. If the UE asks the base station to transmit the content previously stored in the caching memory by the relay node, the relay node can transmit the content owned by the relay node to the UE instead of the base station. By doing so, the UE is able to receive the content with higher quality.

According to the aforementioned caching technique, the relay node selects content highly probable to be requested by the UE in the future based on content popularity or preference of the UE without considering an impact of interference received from a neighbor cell and stores the content in the caching memory in advance. In this case, if the UE is located at a cell edge, the interference received from the neighbor cell becomes stronger. Hence, due to the interference received from the neighboring cell (inter-cell interference), it is highly probable that performance of a reception signal is going to be deteriorated. Hence, although the UE receives the help of content transmission from the relay node, the UE may fail to restore the content. If the UE fails to restore the content, it is necessary for the base station or the relay node to retransmit the content. Hence, retransmission of the content is performed through a resource allocated for retransmission. As a result, since a separate resource is consumed, a transmission efficiency of the whole system can be degraded.

In the following, the present invention proposes a method of storing content and a method of transmitting content capable of enhancing a content transmission efficiency of a system in environment where inter-cell interference may occur.

Figure 9:
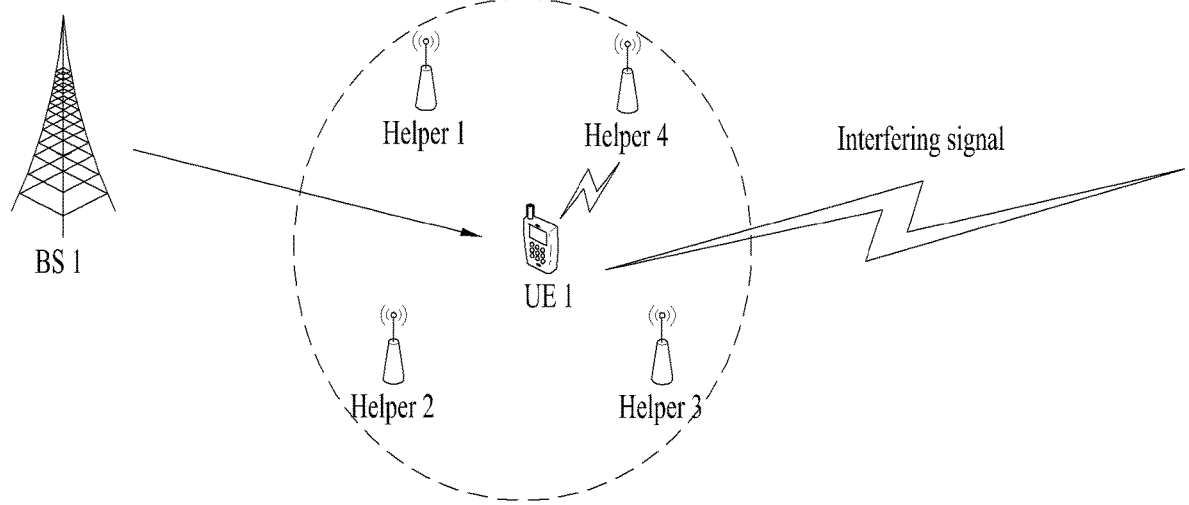
FIG. 9 is a diagram for explaining a method of transmitting content using caching according to one embodiment of the present invention.
Figure 10:
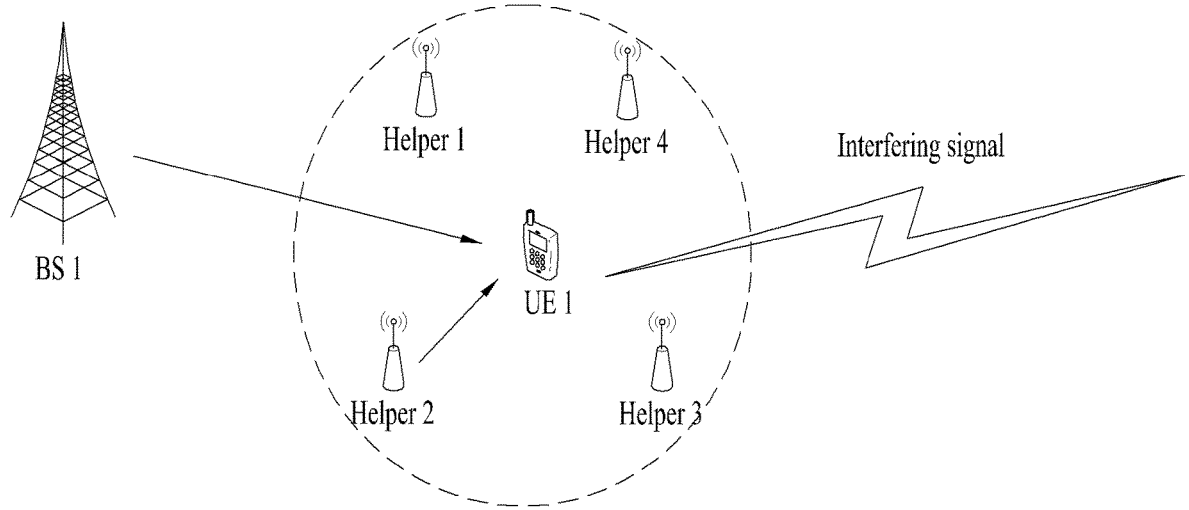
FIG. 10 is a diagram for explaining a method of transmitting content using caching according to a different embodiment of the present invention.

FIGS. 9 and 10 are diagrams for explaining a method of transmitting content according to the present invention. Referring to FIG. 9, a relay node stores contents highly probable to act as inter-cell interference to a UE in advance. If the contents act as interference to the UE, the relay node transmits an interference component to the UE. Having received the interference component, the UE cancels the interference via an interference cancellation scheme and may be able to attempt to restore the contents from a signal component from which the interference is cancelled.

Referring to FIG. 10, one or more relay nodes store contents highly probable to be requested by a UE in a memory. If the UE requests the stored contents, the relay nodes transmit the contents to the UE. In this case, the UE can restore the contents from a signal which is received with high SNR (signal to noise ratio).

The method of transmitting content according to the present invention is explained in more detail.

Figure 11:
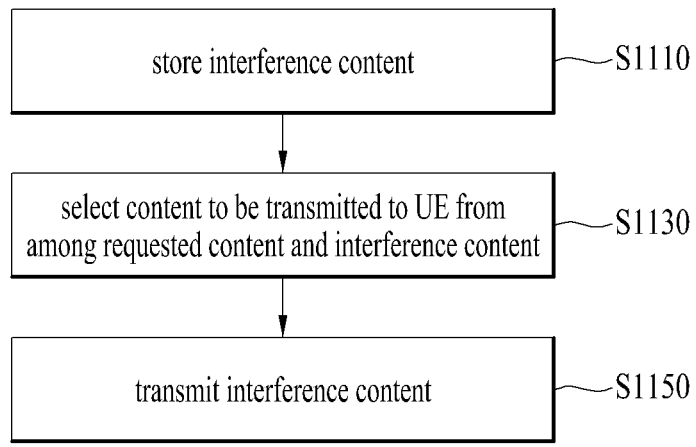
FIG. 11 is a flowchart for a method of transmitting content using caching according to embodiment of the present invention.

FIG. 11 is a flowchart of a method for a relay node to transmit interference content to a UE according to one embodiment of the present invention. In the step S1110, a relay node stores interference content recognized as interference in a memory. In this case, the interference content may correspond to content included in a list of interference contents described later. In the step S1130, if there is a content transmission request, the relay node determines content to be transmitted among the interference content and the content requested by the UE. In this case, the content to be transmitted can be determined based on reception SNR of the UE. Regarding this, it shall be described later. If the transmission of the interference content is beneficial to the content reception of the UE, the relay node transmits the interference content to the UE in the step S1150. Yet, although it is not depicted in FIG. 11, if it is more beneficial to transmit the content requested by the UE rather than the interference content, the relay node transmits the content requested by the UE instead of the interference content. Meanwhile, the procedure shown in FIG. 11 is just an example only. A step can be omitted or added according to the detail explanation described in the following.

In this case, as a method of determining content to be transmitted, it may consider a case of determining the content by a UE and a case of determining the content by a relay node. If the UE determines the content to be transmitted, the UE may determine content to be received based on a determined SNR value and may feedback information on the determined content. Meanwhile, if the relay node determines the content to be transmitted, the relay node can determine the content to be transmitted based on SNR after feedback on the SNR is received from the UE.

Figure 12:
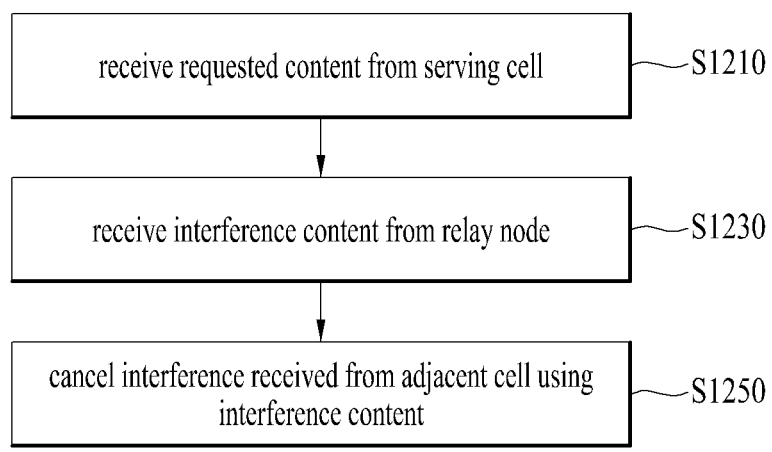
FIG. 12 is a flowchart of a method for a user equipment to receive content according to embodiment of the present invention.

FIG. 12 is a flowchart of a method for a user equipment to receive interference content according to a different embodiment of the present invention. In the step of S1210, a UE receives content requested by the UE from a base station of a serving cell and the UE can receive interference content from a relay node in the step S1230. Of course, although it is not depicted in FIG. 12, the UE is able to receive coordination content in some cases. Or, the UE is able to receive both the coordination content and the interference content. In the step S1250, the UE can restore the content requested by the UE based on the received interference content in a situation that interference received from a neighbor cell is cancelled. Similarly, the procedure shown in FIG. 12 is just an example only. A step can be omitted or added according to the detail explanation described in the following.

In the following, a method of caching content and a method of transmitting and receiving content according to the present invention are explained in more detail.

Caching Step

Relay nodes generate a content list corresponding to a list of contents highly probable to be requested by a UE and an interference content list corresponding to a list of contents highly probable to act as interference to the UE. More specifically, the relay nodes generate the content list based on a record of the contents requested by the UE via cooperation. In this case, the relay nodes generate the list of contents highly probable to be requested by the UE by accumulating a content record requested for a long time. And, the relay nodes generate the list of interference contents by accumulating a content record frequently interfering the UE by restoring an interference signal received from a neighbor cell. In order to generate the lists, it may use a statistical scheme or other schemes.

A relay node distinguishes contents preferred by a user from interference contents acting as interference to the user based on the list and stores the contents in a caching memory. This caching is performed via wireless data transmission transmitted by a base station. If a backhaul link exists between the base station and the relay nodes, the caching can be stored with a data sharing scheme using the backhaul link. And, a caching procedure can be performed by utilizing a timeline at which a user request does not exist.

Content Transmission Preparing Step

Prior to transmitting a content, relay nodes identify contents requested by a UE. And, the relay nodes restore an interference signal received from a neighbor cell or identify interference content acting as interference to a UE with the help of a base station of the neighboring cell.

If the requested content or the interference content is stored in a caching memory of the relay nodes, the relay nodes transmit HARQ (hybrid automatic repeat and request) confirmation response information in response to the content. In this case, the confirmation response information may correspond to ACK. If the contents are not stored in the caching memory, the relay nodes transmit an NACK signal to the base station.

Content Transmission and Restoration Step

If the base station receives the NACK signal from the relay node according to the aforementioned content transmission preparation step, the base station can independently transmit content preferred by the UE to the UE without cooperation with the relay nodes.

On the contrary, if the requested content or the interference content is stored in the caching memory of the relay node, the relay node can transmit the content to the UE by sharing partial information with the base station. In this case, if content showing better opportunistic performance is selected from among the requested content and the interference content according to channel environment and the selected content is transmitted to the UE, the UE can obtain a more enhanced content restoration effect. In the following, a method of transmitting the requested content and the interference content to the UE in a manner of distinguishing the requested content from the interference content is explained in more detail.

Transmission and reception of the interference content are explained in detail with reference to FIG. 9 again.

If transmission of the interference content is beneficial, the UE may inform the base station and/or the relay node of the fact. In this case, as shown in FIG. 9, the base station transmits the requested content preferred by the UE to the UE and the relay node can transmit the interference content to the UE to enable the UE to cancel interference. If there is a relay node having the requested content among relay nodes, the relay node may transmit information via cooperation with the base station or may transmit information instead of the base station.

In this case, the UE can determine the transmission of the interference content or the transmission of the requested content by calculating a gain based on reception SNR (signal to noise ratio) capable of being received from a base station of a serving cell, a relay node, or a base station of a neighbor cell.

A method of performing transmission for interference cancellation can be mainly classified into two types. One is an interference neutralization scheme and another is a scheme using SIC (successive interference cancellation) via interference decoding.

If a relay node uses the interference neutralization scheme, the relay node should control power of an interference signal to make the sum of interference received from a neighbor cell and an interference signal transmitted by the relay node to be 0. In this case, since the interference signal is automatically disappeared, a UE can efficiently restore content requested by the UE. In this case, the interference signal transmitted by the relay node may correspond to a signal that modulation for the interference content has performed.

Meanwhile, if the relay node transmits the interference content through the scheme of using SIC via interference decoding, the UE performs interference decoding via such a scheme as energy combining that combines an interference signal received from a neighbor cell and an interference signal received from a relay node with each other. In the aspect of the UE, if a channel state between the UE and the relay node is good, the UE is able to successfully restore interference information. If the UE obtains content information of interference, the UE can completely cancel an interference component using the SIC scheme. The UE restores the requested content using a signal from which interference is canceled with the SIC.

On the contrary, transmission of the requested content is more beneficial to the UE, the relay node can transmit the requested content to the UE instead of the interference content. As mentioned in the foregoing description, the UE can determine the transmission of the interference content or the transmission of the requested content by calculating a gain based on reception SNR (signal to noise ratio) capable of being received from a base station of a serving cell, a relay node, or a base station of a neighbor cell.

Transmission and reception of the requested content are explained in detail with reference to FIG. 10 again.

When a gain is calculated via reception SNR according to channel environment, if transmission of the requested content is beneficial, as shown in FIG. 10, a base station and a relay node having the content transmit the content to the UE. In this case, the UE considers interference received from a neighbor cell as thermal noise and may be able to obtain more enhanced information amount by performing such a scheme as energy combining on signals received from the base station and the relay node. By doing so, the UE is able to efficiently restore the requested content.

As mentioned in the foregoing description, according to the present invention, if a plurality of relay nodes store a part of contents in caching memory of the relay nodes in advance, it may be able to enhance reception SNR of a signal received by a UE and help content to be successfully transmitted. In environment that interference from a neighbor cell affects relay nodes, the relay nodes collect content preference of the UE and statistical information of content acting as interference of the neighbor cell. The relay nodes store contents highly probable to be requested by the UE in the future and contents highly probable to act as interference to the UE in caching memory of the relay nodes in advance. The relay nodes opportunistically transmit the content requested by the UE or the content acting as interference to the UE to enable the UE to efficiently restore the content.

According to the present invention, when a UE receives inter-cell interference, it may be able to enhance a transmission efficiency of content preferred by the UE via a caching scheme that utilizes caching memory of relay nodes and a content transmission scheme. If a relay node stores interference content, which becomes an interference signal from a neighbor cell, in advance, the relay node transmits the interference signal to the UE to increase content quality received by the UE. And, a reception UE is able to cancel an interference component from an interference signal and may be able to restore content information via a signal from which interference is cancelled. And, the relay node can forward content requested by the UE to the UE in advance. In this case, the UE can restore the content based on higher SNR.

Figure 13:
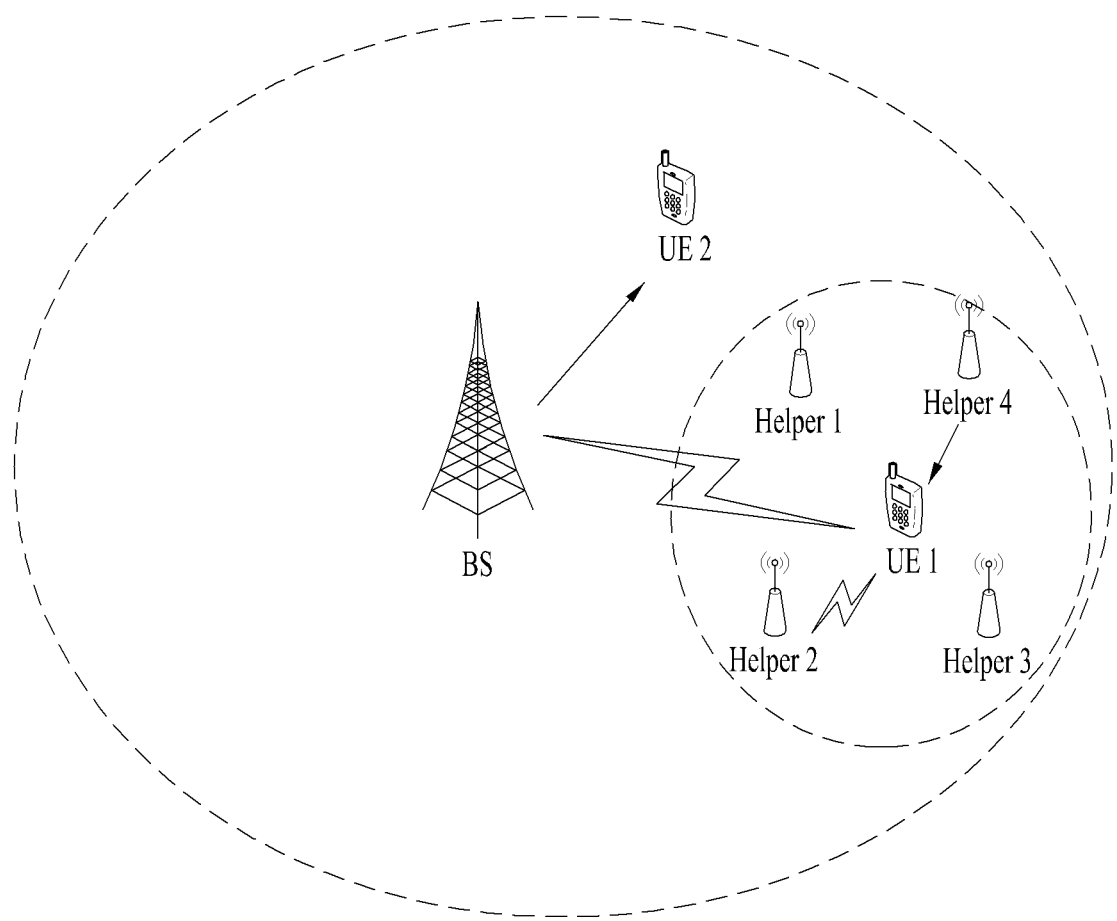
FIG. 13 is a diagram for a different example of a communication system capable of being applied to the present invention.

Meanwhile, FIG. 13 is a diagram for a different example of a communication system capable of being applied to the present invention.

Referring to FIG. 13, the present invention can also be applied to UE-relay environment via cooperation between UEs using a plurality of UEs existing in a cell in single cell environment at which inter-cell interference exists.

As shown in FIG. 13, when a base station transmits content to a UE2 and a UE1 receives different content, interference may influence on the UE1 due a channel between the UE2 and the base station. In this case, a different relay node or UE-relays adjacent to the UE1 may store content in their caching memory in advance and may be able to transmit requested content and interference content at the same time. As a result, a UE is able to efficiently receive and restore the content.

Figure 14:
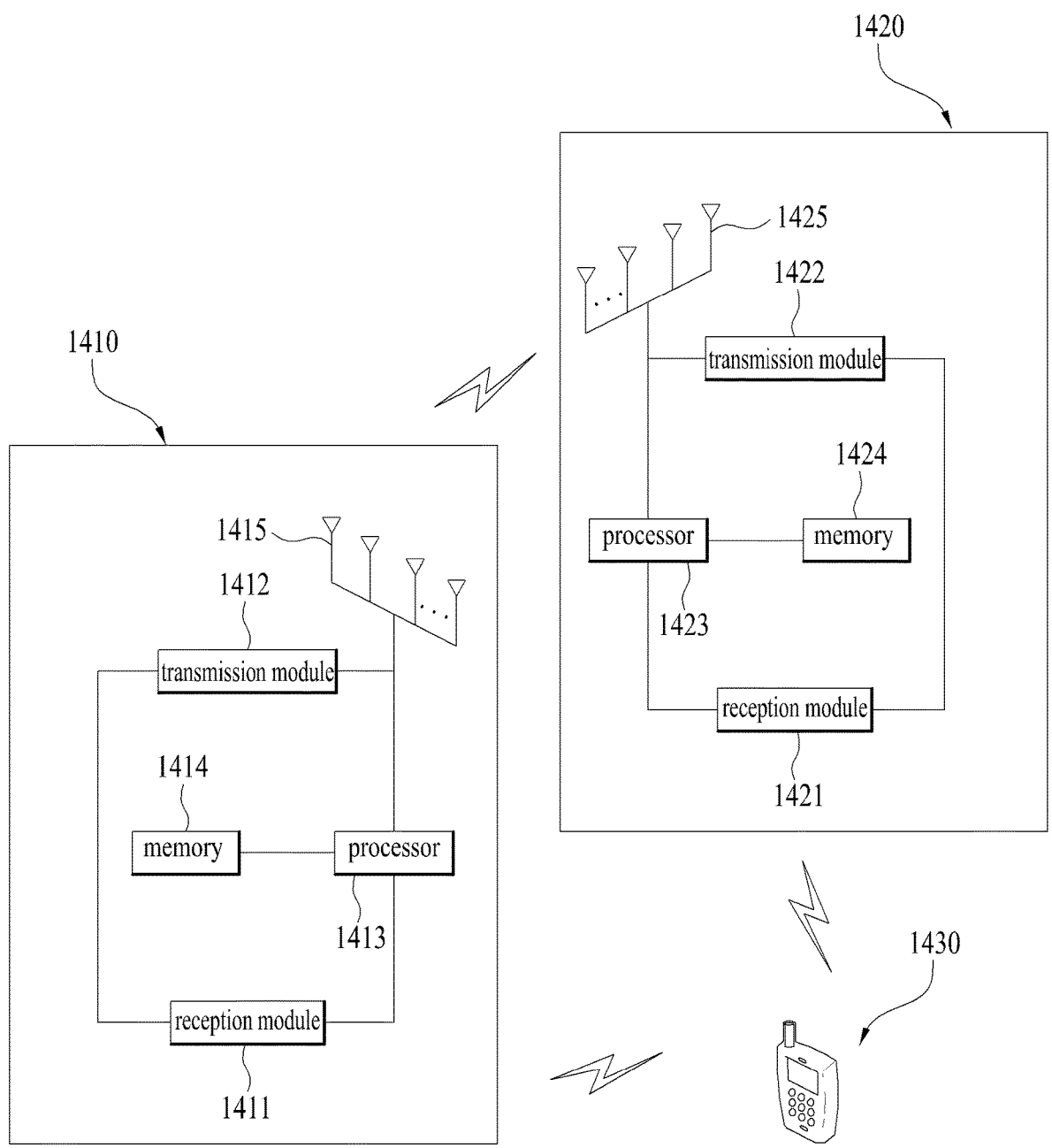
FIG. 14 is a diagram for a wireless communication system including a base station, a relay node, and a user equipment according to the present invention.

FIG. 14 is a diagram for a wireless communication system including a base station, a relay node, and a user equipment according to the present invention.

Referring to FIG. 14, a base station 1410 according to the present invention can include a reception module 1411, a transmission module 1412, a processor 1413, a memory 1414, and a plurality of antennas 1415. A plurality of the antennas 1415 correspond to a base station supporting MIMO transmission/reception. The reception module 1411 can receive various signals, data, and information from at least one of a UE and a relay node in UL. The transmission module 1412 can transmit various signals, data, and information to at least one of a UE and a relay node in DL. The processor 1413 can control overall operation of the base station 1410.

The processor 1413 of the base station performs a function of processing information received by the base station 1410, information to be transmitted to the external, and the like and the memory 1414 can store the processed information and the like for prescribed time. The memory can be replaced with such a configuration element as a buffer (not depicted), or the like.

Referring to FIG. 14, a relay node 1420 according to the present invention can include a reception module 1421, a transmission module 1422, a processor 1423, a memory 1424, and a plurality of antennas 1425. A plurality of the antennas 1425 correspond to a relay node supporting MIMO transmission/reception. The reception module 1421 can include a first reception module and a second reception module. The first reception module can receive various signals, data, and information from a base station in DL. The second reception module can receive various signals, data, and information from a base station in UL. The transmission module 1422 can include a first transmission module and a second transmission module. The first transmission module can transmit various signals, data, and information to the base station in UL and the second transmission module can transmit various signals, data, and information to the UE in DL. The processor 1423 can control overall operation of the relay node 1420.

The processor 1423 of the relay node 1420 performs a function of processing information received by the relay node 1420, information to be transmitted to the external, and the like and the memory 1424 can store the processed information and the like for prescribed time. The memory can be replaced with such a configuration element as a buffer (not depicted), or the like. In this case, the memory 1424 can include a caching memory for performing caching according to the present invention.

Similar to the base station 1410, a user equipment 1430 according to the present invention can include a reception module, a transmission module, a processor, a memory, and a plurality of antennas. A plurality of the antennas correspond to a user equipment supporting MIMO transmission/reception. The reception module can receive various signals, data, and information from at least one of a UE and a relay node in UL. The transmission module can transmit various signals, data, and information to at least one of a UE and a relay node in DL. The processor can control overall operation of the user equipment.

The above base station, user equipment, and the relay node may be configured in such a manner that the above-described various embodiments of the present invention may be implemented independently or in combination of two or more. A redundant description is omitted for clarity.

And, in the exemplary explanation on FIG. 14, the base station 1410 corresponds to a source node (S) in the examples of the present invention, the relay node 1420 correspond to a relay (R), and the user equipment 1430 may correspond to a destination node (D).

The explanation on the base station 1410 mentioned earlier in FIG. 14 can also be applied to a relay node configured to autonomously control a cell. The explanation on the relay node 1420 mentioned earlier in FIG. 14 can also be applied to a user equipment (i.e., UE-relay) configured to help a different user equipment 1430 in cooperative communication environment.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The aforementioned embodiments of the present invention can be applied to various mobile communication systems.

What is claimed is:

1. A method for transmitting, by a relay node, a content using a caching memory, the method comprising:
    generating a first list based on a record of contents requested by a user equipment (UE);
    generating a second list based on restoring an interference signal received from a neighbor cell;
    storing a first content in a caching memory based on the first list;
    storing a second content in the caching memory based on the second list, wherein the first content is content requested to be transmitted to the UE and the second content is content acting as interference to the first content;
    determining a content to be transmitted to the UE between the first content and the second content based on a reception signal to noise ratio (SNR) of the UE;
    transmitting, to the UE, the first content for combining the first content by the UE, when the first content is determined to be transmitted to the UE; and
    transmitting, to the UE, the second content for canceling by the UE an interference caused by a second content transmitted from the neighbor cell to the UE, when the second content is determined to be transmitted to the UE.

2. The method of claim 1, wherein the second content is transmitted to the UE based on an interference neutralization scheme.

3. The method of claim 1, wherein the second content is transmitted to the UE based on a scheme of using successive interference cancellation (SIC) through interference decoding.

4. The method of claim 1, wherein if the first content or the second content is stored in the caching memory, hybrid automatic repeat and request (HARQ) confirmation response information is transmitted to a base station.

5. The method of claim 4, wherein the HARQ confirmation response information is a positive reception response (ACK).

6. A method for receiving, by a user equipment (UE), a content using caching, the method comprising:
    receiving, from a serving cell, a first content requested by the UE;
    receiving, from a relay node, the first content or a second content acting as interference to the first content, wherein whether which content is to be transmitted to the UE between the first content and the second content is determined based on a reception signal to noise ratio (SNR) of the UE;
    restoring the first content by combining the first content received from the serving cell and the first content received from the relay node, when the first content is received from the relay node; and
    restoring the first content by canceling an interference caused by a second content transmitted from a neighbor cell based on the second content received from the relay node, when the second content is received from the relay node,
    wherein the first content is stored in a caching memory of the relay node based on a first list and the second content is stored in the caching memory of the relay node based on a second list, and
    wherein the first list is generated based on a record of contents requested by the UE, and the second list is generated based on restoring an interference signal received from the neighbor cell.

7. The method of claim 6, wherein the second content is transmitted to the UE based on an interference neutralization scheme.

8. The method of claim 6, wherein the second content is transmitted to the UE based on a scheme of using successive interference cancellation (SIC) through interference decoding.

9. A relay node for transmitting a content using a cache memory, the relay node comprising:
    a processor configured to generate a first list based on a record of contents requested by a user equipment (UE) and generate a second list based on restoring an interference signal received from a neighbor cell;
    a caching memory configured to store a first content based on the first list and store a second content based on the second list, wherein the first content is content requested to be transmitted to a user equipment (UE) and the second content is content acting as interference to the first content;
    the processor further configured to determine a content to be transmitted to the UE between the first content and the second content based on a reception signal to noise ratio (SNR) of the UE; and
    a transceiver configured to:
    transmit the first content for combining the first content by the UE, when the first content is determined to be transmitted to the UE, and
    transmit the second content for canceling by the UE an interference caused by a second content transmitted from the neighbor cell to the UE, when the second content is determined to be transmitted to the UE.

10. A user equipment (UE) for receiving a content using caching, the UE comprising:
    a transceiver configured to receive a first content requested by the UE from a serving cell and receive the first content or a second content acting as interference to the first content from a relay node, wherein whether which content is to be transmitted to the UE between the first content and the second content is determined based on a reception signal to noise ratio (SNR) of the UE; and
    a processor configured to:
    restore the first content by combining the first content received from the serving cell and the first content received from the relay node, when the first content is received from the relay node, and
    restore the first content by canceling an interference caused by a second content transmitted from a neighbor cell based on the second content received from the relay node, when the second content is received from the relay node,
    wherein the first content is stored in a caching memory of the relay node based on a first list and the second content is stored in the caching memory of the relay node based on a second list, and wherein the first list is generated based on a record of contents requested by the UE, and the second list is generated based on restoring an interference signal received from the neighbor cell.

\* \* \* \* \*